(12) United States Patent
Heine et al.

(10) Patent No.: US 11,142,338 B2
(45) Date of Patent: Oct. 12, 2021

(54) AIRCRAFT LIGHTING SYSTEMS AND METHODS

(71) Applicant: Zodiac Cabin Controls GmbH, Hamburg (DE)

(72) Inventors: Henrik Heine, Hamburg (DE); Günter Boomgaarden, Scharbeutz (DE); Birger Timm, Stiefmuetterchenweg (DE); Volker Antonczyk, Hamburg (DE); Thierry Despres, Bellevue, WA (US); Lutz Neumann, Hamburg (DE)

(73) Assignee: Zodiac Cabin Controls GmbH, Hamburg (DE)

( * ) Notice: Subject to any disclaimer, the term of this patent is extended or adjusted under 35 U.S.C. 154(b) by 0 days.

(21) Appl. No.: 16/498,608

(22) PCT Filed: Mar. 29, 2018

(86) PCT No.: PCT/IB2018/052156
§ 371 (c)(1),
(2) Date: Sep. 27, 2019

(87) PCT Pub. No.: WO2018/178908
PCT Pub. Date: Oct. 4, 2018

(65) Prior Publication Data
US 2020/0102092 A1 Apr. 2, 2020

Related U.S. Application Data

(60) Provisional application No. 62/478,328, filed on Mar. 29, 2017.

(51) Int. Cl.
*B64D 47/02* (2006.01)
*B64D 11/00* (2006.01)
(Continued)

(52) U.S. Cl.
CPC ............. *B64D 47/02* (2013.01); *H05B 45/22* (2020.01); *H05B 47/105* (2020.01); *H05B 47/11* (2020.01);
(Continued)

(58) Field of Classification Search
CPC ................ B64D 2011/0038; B64D 2011/0053
(Continued)

(56) References Cited

U.S. PATENT DOCUMENTS 7,014,336 B1 * 3/2006 Ducharme ................ F21K 9/20
362/231
9,061,772 B1 6/2015 Hartwell
(Continued)

FOREIGN PATENT DOCUMENTS

| EP | 2960643 | 12/2015 |
| WO | 2006083934 | 8/2006 |

OTHER PUBLICATIONS

International Patent Application No. PCT/IB2018/052156, Search Report and Written Opinion, dated Jun. 5, 2018.

*Primary Examiner* — William J Carter
(74) *Attorney, Agent, or Firm* — Kilpatrick Townsend & Stockton LLP (57) ABSTRACT

An aircraft lighting system includes a light unit configured to emit light, a portable measurement device, and a control unit. The portable measurement device is configured to measure at least one attribute of the light emitted from the light unit and output the measured attribute of the light in an output signal. The control unit is configured to receive the output signal and control the light unit based on the measured attribute. In some aspects, the light unit is positionable in an aircraft, in certain examples, a method of controlling a lighting system includes measuring at least one attribute of light of a light unit with a portable measurement device, (Continued)

transmitting the measured attribute to a control unit, and controlling the light unit based on the measured attribute. In some cases, the method includes measuring the at least one attribute of a light unit in an aircraft.

18 Claims, 5 Drawing Sheets

(51) Int. Cl.
*H05B 47/19* (2020.01)
*H05B 45/22* (2020.01)
*H05B 47/105* (2020.01)
*H05B 47/11* (2020.01)
*H05B 47/195* (2020.01)

(52) U.S. Cl.
CPC ...... *H05B 47/19* (2020.01); *B64D 2011/0038* (2013.01); *H05B 47/195* (2020.01)

(58) Field of Classification Search
USPC .................................. 362/470–471
See application file for complete search history.

(56) References Cited

U.S. PATENT DOCUMENTS

| | | | |
|---|---|---|---|
| 2004/0090787 A1* | 5/2004 | Dowling | H05B 47/18 362/464 |
| 2005/0174473 A1* | 8/2005 | Morgan | H05B 45/00 348/370 |
| 2016/0059953 A1 | 3/2016 | Fagan et al. | |

* cited by examiner

AIRCRAFT LIGHTING SYSTEMS AND METHODS

REFERENCE TO RELATED APPLICATION

This application claims the benefit of U.S. Provisional Application No. 62/478,328, filed Mar. 29, 2017, and entitled HANDHELD MEASUREMENT DEVICE FOR MEASURING LIGHT OUTPUT OF A LIGHTING FIXTURE OR ILLUMINATED SURFACE, the content of which is hereby incorporated by reference in its entirety.

FIELD OF THE INVENTION

This application relates to lighting systems, and more particularly to systems and devices for measuring and controlling light output of a lighting system in an aircraft.

BACKGROUND

Lighting systems are used to provide lighting or illumination in various spaces. For example, an aircraft may include a lighting system to provide lighting at various locations throughout the interior of the cabin of the aircraft. As lighting systems age, the light output coming from one or more light units may change due to degradation of color, degradation of light intensity, and various other aging effects. Such effects may result in uneven lighting in the cabin and detract from the experience of the passenger in the cabin. However, typical lighting systems, particularly those used in aircraft, are not able to adapt or adjust their light output after installation.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, a lighting system includes a light unit, a portable measurement device, and a control unit. In some aspects, the light unit is configured to emit light, and is optionally positionable in an aircraft. The portable measurement device is configured to measure at least one attribute of the light emitted from the light unit and output the measured attribute of the light in an output signal. The control unit is configured to receive the output signal and control the light unit based on the measured attribute.

In some cases, the portable measurement device includes a sensor, a visual display, and a communication module. In various aspects, the portable measurement device further includes a power source and a status indicator. According to various cases, the at least one attribute of the light emitted from the light unit includes an intensity of the light or a color of the light. In certain aspects, the light unit includes a plurality of light units, where the portable measurement device is configured to measure the at least one attribute of the light emitted from each light unit, and where the control unit is configured to control each light unit based on the measured attribute corresponding to each light unit. In various examples, the control unit is configured to control each light unit such that the at least one attribute of the light emitted from each light unit is the same.

In various examples, the control unit is configured to control the light unit based on the measured attribute by comparing the at least one measured attribute to a predetermined attribute and controlling the light emitted from the light unit such that the measured attribute matches the predetermined attribute. According to some examples, the control unit is further configured to determine the predetermined attribute by receiving a reference signal from the portable measurement device, where the reference signal includes the predetermined attribute measured by the portable measurement device from a reference light unit.

In certain aspects, the light unit includes a plurality of light units, and the plurality of light units including at least one reference light unit. In various cases, the portable measurement device is configured to measure the at least one attribute of the light emitted from the reference light unit, and the control unit is configured to control each light unit based on the measured attribute from the reference light unit. In various aspects, one of the plurality of light units includes a first type of light source and another of the plurality of light units includes a second type of light source different from the first type of light source. In some examples, the light unit includes a unique identifier, and the portable measurement device is configured to receive the unique identifier before measuring the at least one attribute of the light emitted from the light unit and output the measured attribute of the light with the unique identifier in the output signal.

According to some examples, a method of controlling a lighting system includes measuring at least one attribute of light of a light unit in an aircraft with a portable measurement device, transmitting the measured attribute to a control unit, and controlling the light unit based on the measured attribute.

In various examples, the light unit includes a plurality of light units, and the plurality of light units includes a reference light unit. In some aspects, measuring includes measuring the at least one attribute of light of the reference light unit, and controlling includes controlling the plurality of light units based on the measured attribute from the reference light unit, According to certain examples, controlling includes controlling each light unit such that the at least one attribute of the light emitted from each light unit is the same.

In certain aspects, the light unit includes a plurality of light units, measuring includes measuring the at least one attribute of light of each of the plurality of light units, and controlling includes controlling each of the plurality of light units based on the measured attribute from that light unit. According to various examples, controlling includes controlling each light unit such that the at least one attribute of the light emitted from each light unit is the same.

In certain cases, measuring includes measuring at least one of an intensity of the light or a color of the light. In some aspects, controlling includes comparing the measured attribute to reference data and adjusting the light emitted from the light unit based on a difference between the measured attribute and the reference data. In various cases, the method includes displaying a last color measured on the portable measurement device. In certain examples, the method includes measuring a color of an illuminated surface with the portable measurement device, and controlling the light unit such that a color of the light emitted from the light unit matches the color of the illuminated surface.

According to various examples, a lighting system includes a portable measurement device and a control unit. The portable measurement device includes a sensor, a display, and a communication module, and the portable measurement device is configured to measure at least one attribute of light emitted from a light unit within an aircraft cabin, and output the measured attribute of the light in an output signal. The control unit is configured to receive the output signal and control the light unit based on the measured attribute.

In some cases, the at least one attribute of the light emitted from the light unit includes an intensity of the light or a color of the light. In certain aspects, the portable measurement device is configured to determine a color rendering index (CRI), a correlated color temperature (CCT), or color coordinates of the light. In various cases, the communication module includes an infrared communication module with an infrared communication interface. According to some aspects, the system further includes the light unit, and the control unit is a component of the light unit.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "left," "right," "front," and "back," among others, are intended to refer to the orientation as illustrated and described in the figure (or figures) to which the components and directions are referencing. References herein to "consisting of" may, in at least some circumstances, encompass "consisting essentially of" or "comprising."

In some aspects, disclosed is a lighting system, including, but not limited to, a lighting system used in aircraft. The lighting system includes a portable measurement device that is independent from and freely movable relative to light units of the aircraft (or other environment). In some aspects, the portable measurement device includes a light sensor, a communication module, and a visual display. In certain cases, the portable measurement device includes a power source and a status indicator. In some aspects, the portable measurement device includes control buttons. The portable measurement device is configured to measure at least one attribute of the light emitted from a light unit with the sensor. In certain cases, the portable measurement device is configured to detect a color and/or a light intensity of the light. In certain examples, based on the measured data, the portable measuring device can calculate different attributes of the light, including, but not limited to, color rendering index (CRI), correlated color temperature (CCT), color coordinates, etc. The portable measurement device is further configured to output the measured attribute in an output signal, and transfer the output signal to a control unit of the lighting system. Optionally, the portable measurement device is configured to display a last color that was measured, provide status information about the portable measurement device, provide numeric data of measurements, provide text messages to the user, and/or provide various other features as desired.

The control unit of the lighting system receives the output signal from the portable measurement device, which includes the measured attribute data, and controls the light unit based on the measured attribute data (and/or based on the attribute data determined by the portable measurement device based on the measured attribute data). In some cases, the controller compares the measured attribute data with reference data (which may be stored in the system) to detect deviations from predetermined light color and/or light intensity values, among others. In various examples, the control unit controls the light units such that one or more light units are synchronized. In certain cases, the control unit controls the light units such that one or more light units are adjusted.

The lighting system may also include at least one light unit configured to emit light, and in many examples includes a plurality of light units. In some examples, the light units are LED light units, although they need not be. The light units may be various types of light sources. For example, the light units may be strip light units, dome light units, spot light units, or various other types of light sources. As some non-limiting examples, in an aircraft cabin, different light units optionally include spot light units for the passenger seats, strip light units for ceiling and sidewalls, dome light units for the galley and entry threshold, etc. In other examples, different light units may be provided in different parts of the aircraft cabin.

In some examples, with the lighting system, the light unit and system settings can be adjusted as desired. For example, the light unit and system settings may be adjusted during aircraft maintenance, by flight attendants during travel, etc. The light unit and system settings can be adjusted by using the portable measurement device such that light settings can be changed, adapted, and synchronized according to customer needs at any time. In some examples, the customers (e.g., airlines or other aircraft operators) may change the lighting system parameters to achieve a fleet-wide commonality of output (e.g., with airline brand colors), even if the customer has different aircraft models with cabin interiors and light units of different states and ages.

Figure 1:
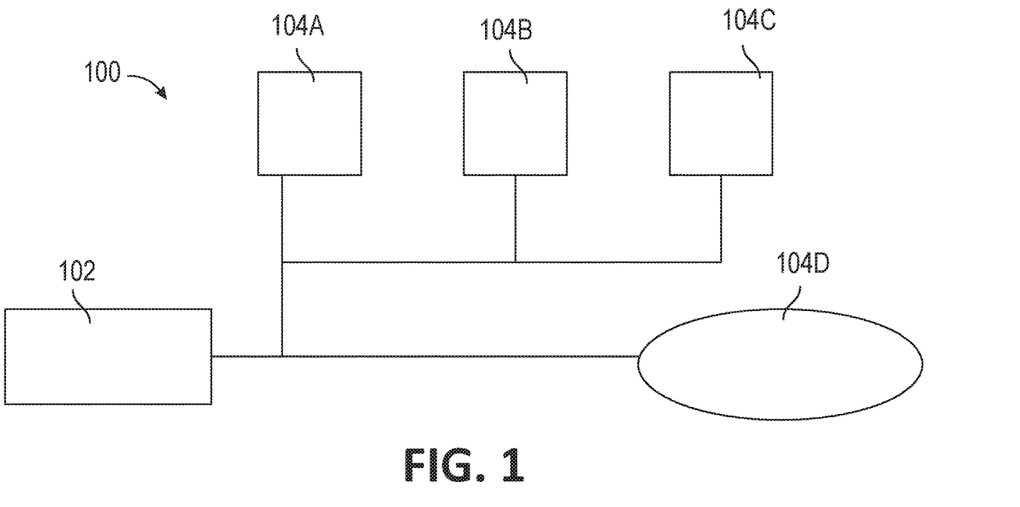
FIG. 1 is a schematic of a lighting system according to aspects of the current disclosure.
Figure 2:
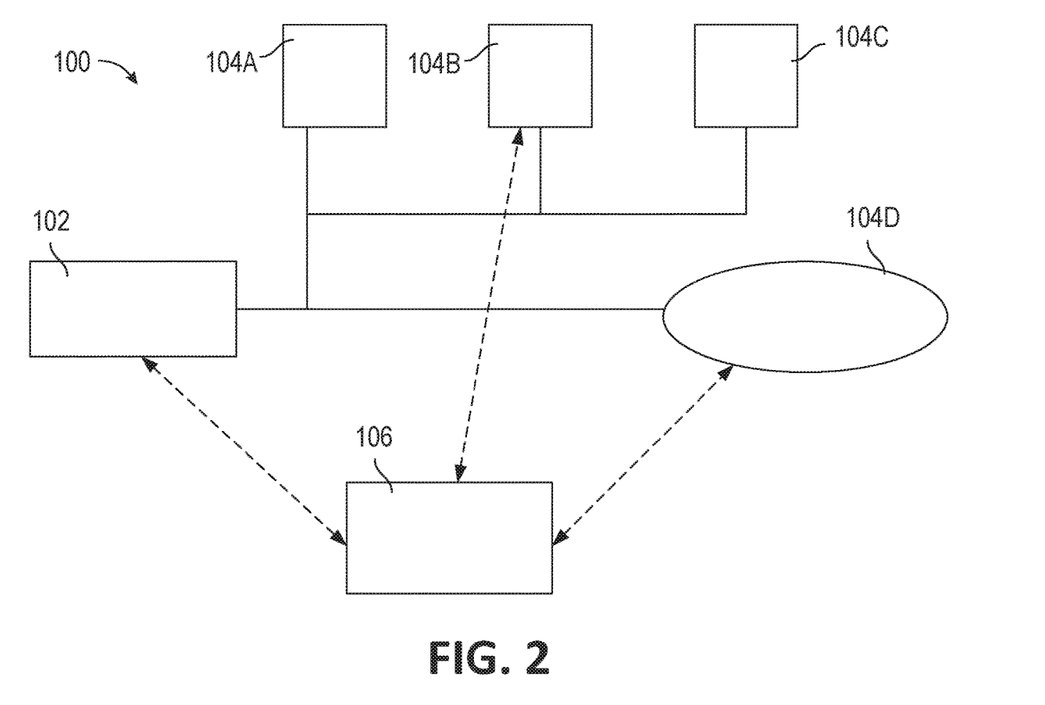
FIG. 2 is a schematic of the lighting system of FIG. 1 with a handheld measurement device according to aspects of the current disclosure.

FIGS. 1 and 2 are schematics of a lighting system 100 according to aspects of the current disclosure. The lighting system 100 may be implemented in various environments including, but not limited to, the cabin of an aircraft. In some examples, the lighting system 100 includes a controller 102, and in certain aspects may include a plurality of controllers. In some examples, the controller 102 is an independent component; however, in other examples, the controller 102 may be a component of a light unit 104 (i.e., one or more light units 104 may include a controller on the light unit 104 itself).

The controller 102 is coupled to one or more light units 104. In the example of FIGS. 1 and 2, the controller 102 is communicatively connected to four light units 104A-D. The controller 102 may be connected to the light units 104 through various suitable mechanisms including, but not limited wireless communication, wired communication, Bluetooth, WiFi, infrared communication, etc. In some optional examples, the controller 102 is connected to the same type of light unit 104 (e.g., all of the light units are strip lights, dome lights, spot lights, etc.). In other optional examples, the controller 102 is connected to at least two different types of light units 104. In the example of FIGS. 1 and 2, the light units 104A-C are a first type of light unit (e.g., a spot light unit) and the light unit 104D is a second type of light unit different from the first type of light unit (e.g., a dome light unit).

A portable measurement device 106 is also provided with the lighting system 100. The portable measurement device 106 is independent from and freely movable relative to the light units 104. In various aspects, the portable measurement device 106 includes at least one sensor such that the portable measurement device 106 can detect the light emitted by at least one of the light units 104. In some examples, the portable measurement device 106 detects the light emitted by more than one light unit 104 (e.g., by light unit 104B and 104D as illustrated in FIG. 2); however, in other examples, one of the light units 104 (e.g., light unit 104A) is a reference light unit 105, and the portable measurement device 106 detects the light emitted by the reference light unit 105 (see, e.g., FIG. 6). In certain aspects, the portable measurement device 106 is configured to measure at least one attribute of the light, including, but not limited to, light intensity, light color, CRI, COT, color coordinates, etc.

In certain examples, after detecting the light, the portable measurement device 106 transfers the measured data to the controller 102. In some optional examples, the portable measurement device 106 may store the measured data for later transfer and/or documentation. The data transfer between the portable measurement device 106 and the controller 102 may include various suitable communication mechanisms including, but not limited to, a wired connection, wireless connection, Bluetooth, WiFi, infrared communication, etc.

Based on the measured data, the controller 102 controls the light units 104. In some examples, the controller 102 controls the light units 104 by sending control data to each light unit 104. The control data may include at least color and brightness information. In various examples, the controller 102 compares the measured data with reference data to detect deviations from predetermined light color and/or intensity values. In various examples, the reference data may include data from a reference light unit or predetermined data (e.g., predetermined color and/or brightness). In some examples, the light units 104 are controlled such that at least two light units 104 are set to be the same color as the reference light unit. In other examples, the light units 104 are controlled such that at least two light units 104 are set to the same light intensity and/or brightness. In certain cases, the light units 104 are controlled such that the light units 104 have a predetermined pattern of color and/or brightness. In some examples, the portable measurement device 106 measures the light as it is actually perceived and the light units 104 are controlled as the light is actually perceived rather than as the light is emitted, although it need not.

In various examples, the measured data includes a unique identifier. In some non-limiting examples, the unique identifier includes an identification number. In various examples, before taking the measurement, the portable measurement device 106 determines the identification number (or other unique identifier), and then transmits the unique identifier to the controller with the measured data. In some examples, the unique identifier is a light signal emitted by the light unit 104.

Figure 3:
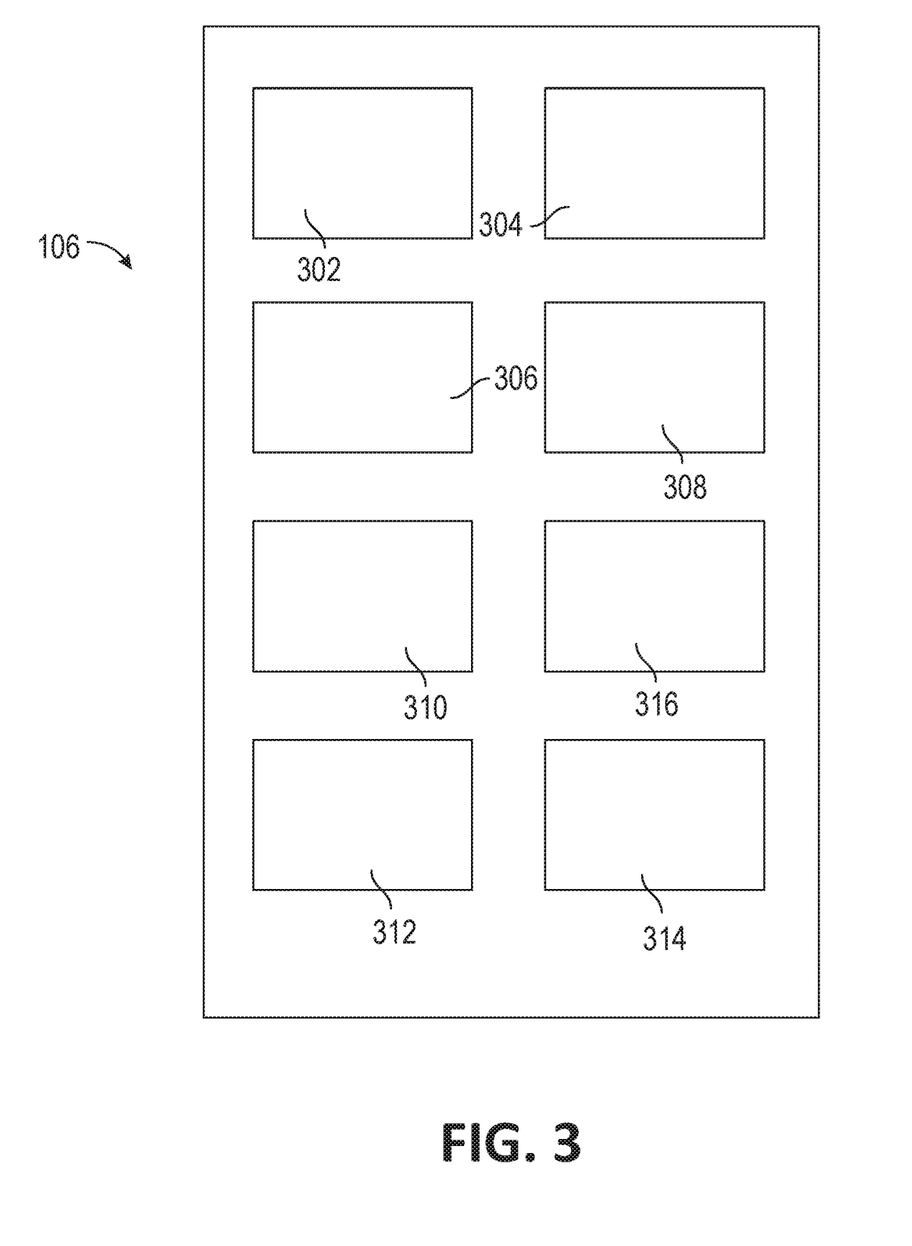
FIG. 3 is a schematic of the handheld measurement device of FIG. 2 according to aspects of the current disclosure.

FIG. 3 is a schematic of the portable measurement device 106. The portable measurement device 106 is independent from and freely movable relative to the light units 104, In certain aspects, a single portable measurement device 106 may be used for a plurality of light units 104. In addition, the portable measurement device 106 does not necessarily need to travel everywhere that the light units 104 go. As one non-limiting example, in an aircraft, the portable measurement device 106 may be utilized while the aircraft is on the ground, and then removed from the aircraft before the aircraft is in the air. As such, the portable measurement device 106 does not need to be a flying piece of equipment (although it could be included to change or adjust light units 104 midflight as desired by the customer).

As illustrated, the portable measurement device 106 includes a sensor 302, a visual display 304, and a communication module 306. The portable measurement device 106 may also include a power source 308 and/or a status indicator 310. The portable measurement device 106 also includes a controller having a processor 312 and a memory 314. In some examples, the sensor 302 is a light sensor configured to detect various attributes of light. In various examples, the visual display 304 is configured to provide information to the user of the portable measurement device 106. For example, in some non-limiting cases, the portable measurement device 106 may display the last color that was measured, numeric data of measurements, text messages, or other information to the user through the visual display 304. In some cases, the communication module enables communication between the portable measurement device 106 and the controller 102, Optionally, the communication module 306 includes a communication interface 307 (see FIG. 5). In various aspects, the power source 308 may include batteries or other suitable power sources.

In certain aspects, the status indicator 310 may be a component of the visual display 304 or may be a separate component. In various cases, the status indicator 310 provides status information about the portable measurement device 106 to the user, including, but not limited to, a ready to measure indication, a not ready to measure indication, a battery low indication, a measurement data okay indication, an error indication, etc. The controller may be configured to perform initial analysis of the measured data (e.g., calculate CCT, color coordinates, CRI, etc.), In various aspects, the controller includes a processor 312 and a memory 314. The controller may further be configured to control various aspects of the portable measurement device 106. As one non-limiting example, the controller may control when data transmissions are sent between the portable measurement device 106 and the controller 104. Optionally, buttons 316 or other features (e.g., a keypad or other input device) may be provided such that the user of the portable measurement device 106 can perform various tasks on or with the portable measurement device 106.

Figure 4:
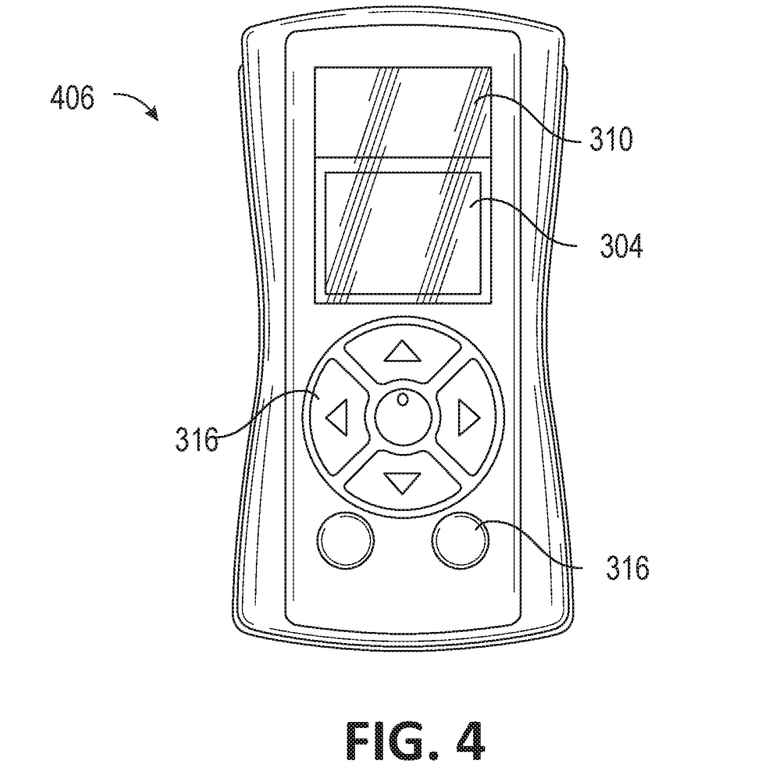
FIG. 4 is a front view of a handheld measurement device according to aspects of the current disclosure.
Figure 5:
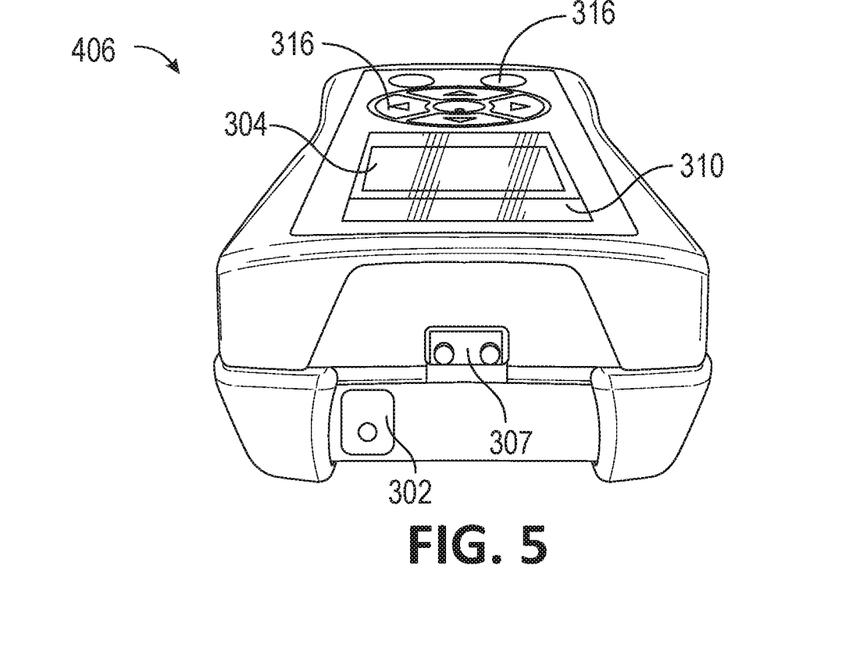
FIG. 5 is a perspective view of the handheld measurement device of FIG. 4.
Figure 6:
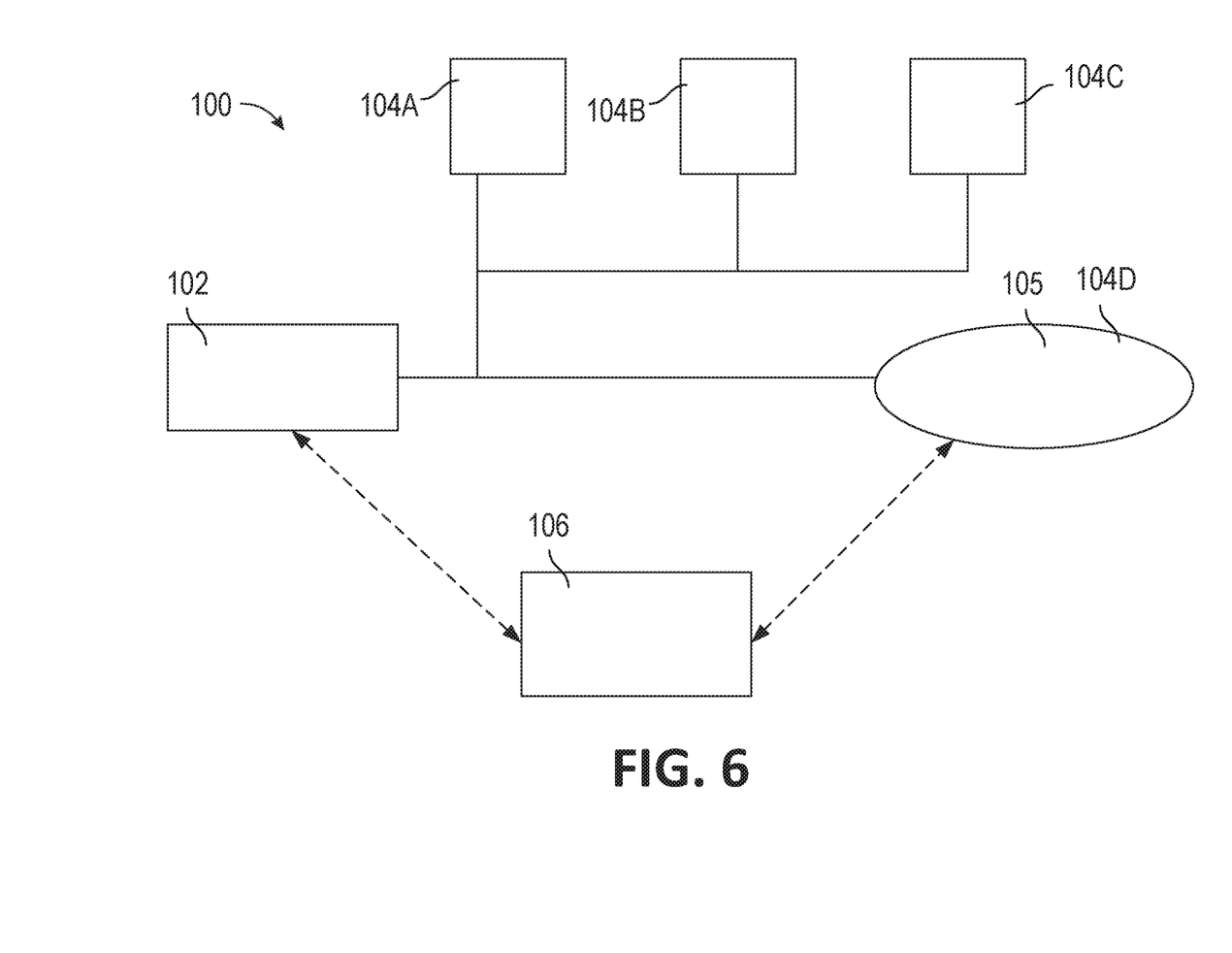
FIG. 6 is a schematic of a lighting system with a handheld measurement device according to aspects of the current disclosure.

FIGS. 4 and 5 illustrate another example of a portable measurement device 406 that is substantially similar to the portable measurement device 106, FIG. 6 illustrates an example of the lighting system 100 with the reference light unit 105.

Figure 7:
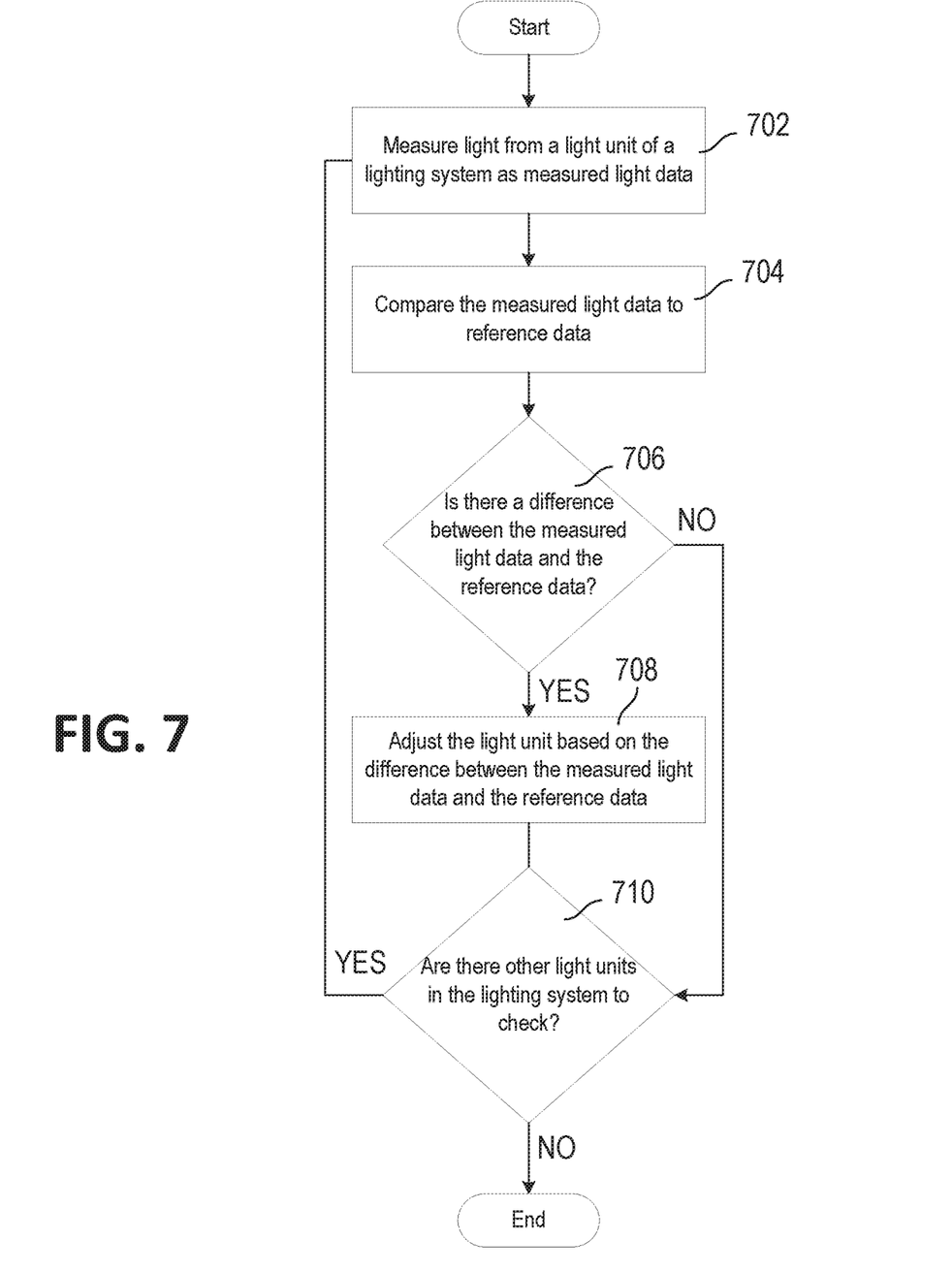
FIG. 7 is a flowchart of steps of method of controlling a lighting system according to aspects of the current disclosure.

Referring to FIG. 7, a non-limiting example of a method of controlling a light unit 104 is also provided. In some examples, in a step 702, the method includes measuring the light from the light unit 104 of the lighting system 100 with the portable measurement device 106. In various examples, the method includes measuring the light from a plurality of light units 104. In certain cases, measuring the light includes measuring at least one attribute of the light, such as an intensity or color of the light, among others. Optionally, the method includes calculating an aspect about the light, such as light intensity, light color, CRI, CCT, color coordinates, etc. The method includes transmitting the measured data from the portable measurement device 106 as an output signal to the controller 102.

In some examples, the method includes controlling one or more of the light unit 104 based on the measured data. In certain examples, controlling the light unit 104 includes adjusting a color or a brightness of the light. In various examples, controlling the light unit 104 includes synchronizing, controlling, and/or adjusting at least two light units 104 based on the measured data. In various cases, in a step 704, controlling the light unit 104 includes comparing the measured data to reference data, and after determining whether there is a difference between the measured data and the reference data in a step 706, adjusting the light emitted from the light unit 104 based on a difference between the measured attribute and the reference data in a step 708. Optionally, in a step 710, it is determined whether other light units 104 in the lighting system 100 need to be checked for controlling, synchronizing, and/or adjusting. In some cases with a plurality of light units 104, controlling and adjusting the light optionally includes comparing the measured data for each light unit to the reference data and adjusting the light emitted from a particular light unit 104 based on a difference between the measured attribute from that light unit 104 and the reference data. In other examples with a plurality of light units 104, controlling and adjusting the light optionally includes comparing the measured data from a reference light unit 105 to the reference data and adjusting each light unit 104 based on a difference between the measured data from the reference light unit 105 and the reference data. In various examples, the method includes measuring light from another light unit 104 with the portable measurement device 106 and controlling that light unit 104. In some examples, the next light unit 104 is in the same aircraft cabin, while in other examples the next light unit 104 is in a different aircraft cabin.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A lighting system comprising: a light unit positionable in an aircraft and configured to emit light; a portable measurement device configured to measure at least one attribute of the light emitted from the light unit and output the measured attribute of the light in an output signal; and a control unit configured to receive the output signal and control the light unit based on the measured attribute.

EC 2. The lighting system of any of the preceding or subsequent example combinations, wherein the portable measurement device comprises a sensor, a visual display, and a communication module.

EC 3. The lighting system of any of the preceding or subsequent example combinations, wherein the portable measurement device further comprises a power source and a status indicator.

EC 4. The lighting system of any of the preceding or subsequent example combinations, wherein the at least one attribute of the light emitted from the light unit comprises an intensity of the light or a color of the light.

EC 5. The lighting system of any of the preceding or subsequent example combinations, wherein the light unit comprises a plurality of light units, wherein the portable measurement device is configured to measure the at least one attribute of the light emitted from each light unit, and wherein the control unit is configured to control each light unit based on the measured attribute corresponding to each light unit.

EC 6. The lighting system of any of the preceding or subsequent example combinations, wherein the control unit is configured to control each light unit such that the at least one attribute of the light emitted from each light unit is the same.

EC 7. The lighting system of any of the preceding or subsequent example combinations, wherein the control unit is configured to control the light unit based on the measured attribute by comparing the at least one measured attribute to a predetermined attribute and controlling the light emitted from the light unit such that the measured attribute matches the predetermined attribute.

EC 8. The lighting system of any of the preceding or subsequent example combinations, wherein the control unit is further configured to determine the predetermined attribute by receiving a reference signal from the portable measurement device, wherein the reference signal comprises the predetermined attribute measured by the portable measurement device from a reference light unit.

EC 9. The lighting system of any of the preceding or subsequent example combinations, wherein the light unit comprises a plurality of light units, the plurality of light units including at least one reference light unit, wherein the portable measurement device is configured to measure the at least one attribute of the light emitted from the reference light unit, and wherein the control unit is configured to control each light unit based on the measured attribute from the reference light unit.

EC 10. The lighting system of any of the preceding or subsequent example combinations, wherein one of the plurality of light units comprises a first type of light source and another of the plurality of light units comprises a second type of light source different from the first type of light source.

EC 11. The lighting system of any of the preceding or subsequent example combinations, wherein the light unit comprises a unique identifier, and wherein the a portable measurement device is configured to receive the unique identifier before measuring the at least one attribute of the light emitted from the light unit and output the measured attribute of the light with the unique identifier in the output signal.

EC 12. A method of controlling a lighting system comprising: measuring at least one attribute of light of a light unit in an aircraft with a portable measurement device; transmitting the measured attribute to a control unit; and controlling the light unit based on the measured attribute.

EC 13. The method of any of the preceding or subsequent example combinations, wherein the light unit comprises a plurality of light units, the plurality of light units comprising a reference light unit, wherein measuring comprises measuring the at least one attribute of light of the reference light unit, and wherein controlling comprises controlling the plurality of light units based on the measured attribute from the reference light unit.

EC 14. The method of any of the preceding or subsequent example combinations, wherein controlling comprises controlling each light unit such that the at least one attribute of the light emitted from each light unit is the same.

EC 15. The method of any of the preceding or subsequent example combinations, wherein the light unit comprises a plurality of light units, wherein measuring comprises measuring the at least one attribute of light of each of the plurality of light units, and wherein controlling comprises controlling each of the plurality of light units based on the measured attribute from that light unit.

EC 16. The method of any of the preceding or subsequent example combinations, wherein controlling comprises controlling each light unit such that the at least one attribute of the light emitted from each light unit is the same EC 17. The method of any of the preceding or subsequent example combinations, wherein measuring comprises measuring at least one of an intensity of the light or a color of the light.

EC 18. The method of any of the preceding or subsequent example combinations, wherein controlling comprises comparing the measured attribute to reference data and adjusting the light emitted from the light unit based on a difference between the measured attribute and the reference data.

EC 19. The method of any of the preceding or subsequent example combinations, further comprising displaying a last color measured on the portable measurement device.

EC 20. The method of any of the preceding or subsequent example combinations, further comprising measuring a color of an illuminated surface with the portable measurement device, and controlling the light unit such that a color of the light emitted from the light unit matches the color of the illuminated surface.

EC 21. A lighting system comprising: a portable measurement device comprising a sensor, a display, and a communication module, wherein the portable measurement device is configured to measure at least one attribute of light emitted from a light unit within an aircraft cabin, and output the measured attribute of the light in an output signal; and a control unit configured to receive the output signal and control the light unit based on the measured attribute.

EC 22, The lighting system of any of the preceding or subsequent example combinations, wherein the at least one attribute of the light emitted from the light unit comprises an intensity of the light or a color of the light.

EC 23. The lighting system of any of the preceding or subsequent example combinations, wherein the portable measurement device is configured to determine a color rendering index (CRI), a correlated color temperature (CCT), or color coordinates of the light.

EC 24. The lighting system of any of the preceding or subsequent example combinations, wherein the communication module comprises an infrared communication module with an infrared communication interface.

EC 25. The lighting system of any of the preceding or subsequent example combinations, further comprising the light unit, and wherein the control unit is a component of the light unit.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. An aircraft lighting system comprising:
    a light unit positionable in an aircraft and configured to emit light;
    a portable and handheld measurement device comprising;
        a sensor and a visual display on the portable and handheld measurement device,
        a controller;
        wherein the portable and handheld measurement device is configured to measure at least one attribute of the light emitted from the light unit and output the measured attribute of the light in an output signal; and
        wherein the controller is configured to perform initial analysis of the measured attribute;
    a control unit connected to the light unit via wireless communication and configured to receive the output signal from the controller of the portable and handheld measurement device and control the light unit based on the measured attribute; and
    wherein, when the control unit receives the measured attribute, the control unit compares the measured attribute to a predetermined attribute and adjusts the light emitted from the light unit based on a difference between the measured attribute and the predetermined attribute.

2. The aircraft lighting system of claim 1, wherein the portable measurement device further comprises a communication module, a power source and a status indicator.

3. The aircraft lighting system of claim 1, wherein the at least one attribute of the light emitted from the light unit comprises an intensity of the light or a color of the light.

4. The aircraft lighting system of claim 1, wherein the light unit comprises a plurality of light units, wherein the portable measurement device is configured to measure the at least one attribute of the light emitted from at least one of the plurality of light units, and wherein the control unit is configured to control each light unit of the plurality of light units based on the measured attribute.

5. The aircraft lighting system of claim 4, wherein the control unit is configured to control each light unit of the plurality of light units such that the at least one attribute of the light emitted from each light unit of the plurality of light units is the same.

6. The aircraft lighting system of claim 4, wherein one of the plurality of light units is a reference light unit, wherein the portable measurement device is configured to measure the at least one attribute of the light emitted from the reference light unit, and wherein the control unit is configured to control each light unit of the plurality of light units based on the measured attribute from the reference light unit.

7. The aircraft lighting system of claim 4, wherein one of the plurality of light units comprises a first type of light source and another of the plurality of light units comprises a second type of light source different from the first type of light source.

8. A method of controlling a lighting system comprising:
measuring at least one attribute of light of a light unit in an aircraft with a portable and handheld measurement device, wherein the portable and handheld measurement device comprises a sensor and a visual display on the portable and handheld measurement device, and a controller;
performing initial analysis of the measured attribute;
transmitting the measured attribute via wireless communication from the controller to a control unit;
comparing the measured attribute to a predetermined attribute; and
adjusting the light unit based on a difference between the measured attribute and the predetermined attribute.

9. The method of claim 8, wherein the light unit comprises a plurality of light units, the plurality of light units comprising a reference light unit,
wherein measuring comprises measuring the at least one attribute of light of each of the reference light unit and one or more of the plurality of light units,
wherein the at least one attribute of light of the reference light unit is the predetermined attribute and the at least one attribute of the one or more plurality of light units is the measured attribute,
and wherein adjusting comprises adjusting the one or more of the plurality of light units based on a difference between the measured attribute and the predetermined attribute.

10. The method of claim 9, wherein adjusting further comprises adjusting each light unit of the plurality of light units such that the at least one attribute of light emitted from each light unit of the plurality of light units is the same.

11. The method of claim 8, wherein the light unit comprises a plurality of light units, wherein measuring comprises measuring the at least one attribute of light of each of the plurality of light units, wherein comparing comprises comparing the measured attribute of each of the plurality of light units to the predetermined attribute, and wherein adjusting comprises adjusting each of the plurality of light units based on a difference between the measured attribute and the predetermined attribute.

12. The method of claim 8, wherein measuring comprises measuring at least one of an intensity of the light or a color of the light.

13. The method of claim 8, further comprising measuring a color of an illuminated surface with the portable measurement device, and controlling the light unit such that a color of the light emitted from the light unit matches the color of the illuminated surface.

14. A lighting system comprising:
a portable and handheld measurement device comprising:
a sensor, a visual display, and a communication module,
a controller;
wherein the portable and handheld measurement device is configured to measure at least one attribute of light emitted from a light unit within an aircraft cabin, and output the measured attribute of the light in an output signal; and
wherein the controller is configured to perform initial analysis of the measured attribute;
a control unit configured to wirelessly receive the output signal from the controller of the portable and handheld measurement device;
wherein, when the control unit receives the output signal, the control unit compares the measured attribute to a predetermined attribute and adjusts the light unit based on a difference between the measured attribute and the predetermined attribute.

15. The lighting system of claim 14, wherein the at least one attribute of light emitted from the light unit comprises an intensity of the light or a color of the light.

16. The lighting system of claim 14, wherein the portable measurement device is configured to determine at least one of a color rendering index (CR1), a correlated color temperature (CCT), or color coordinates of the light.

17. The lighting system of claim 14, wherein the communication module comprises an infrared communication module with an infrared communication interface.

18. The lighting system of claim 14, further comprising the light unit, and wherein the control unit is a component of the light unit.

* * * * *